US011998131B1

(12) United States Patent
Marlin

(10) Patent No.: US 11,998,131 B1
(45) Date of Patent: Jun. 4, 2024

(54) AUTOMATIC MAIL NOTIFICATION SYSTEM

(71) Applicant: Barry N. Marlin, Beverly Hills, CA (US)

(72) Inventor: Barry N. Marlin, Beverly Hills, CA (US)

( * ) Notice: Subject to any disclaimer, the term of this patent is extended or adjusted under 35 U.S.C. 154(b) by 0 days.

(21) Appl. No.: 18/314,507

(22) Filed: May 9, 2023

(51) Int. Cl.
*G08B 13/02* (2006.01)
*A47G 29/122* (2006.01)
*G08B 5/22* (2006.01)

(52) U.S. Cl.
CPC ......... *A47G 29/1225* (2013.01); *G08B 5/223* (2013.01); *A47G 2029/1226* (2013.01)

(58) Field of Classification Search
CPC ........ A47G 29/1225; A47G 2029/1226; G08B 5/223
See application file for complete search history.

(56) References Cited

U.S. PATENT DOCUMENTS 6,462,659 B1 * 10/2002 Schuette ............ A47G 29/1214 340/569
2015/0359371 A1 * 12/2015 Giovinco ................ H04W 4/12 340/569
2019/0167024 A1 * 6/2019 Bradish ................ A47G 29/121

* cited by examiner

*Primary Examiner* — An T Nguyen
(74) *Attorney, Agent, or Firm* — ALONZO & ASSOCIATES; Arlyn Alonzo

(57) ABSTRACT

Aspects of the disclosure are directed to a mail notification system. In accordance with one aspect, a mail notification system, includes an energy emitter device configured to emit energy; a sensing device coupled to the energy emitter device, the sensing device configured to receive the energy from the energy emitter device to produce a sensed signal; a detection device coupled to the sensing device, the detection device configured to detect a transition state of the sensed signal and configured to produce a digital message; and a housing configured to receive one or more mail, wherein the housing houses the energy emitter device, the sensing device, and the detection device.

20 Claims, 5 Drawing Sheets

AUTOMATIC MAIL NOTIFICATION SYSTEM

TECHNICAL FIELD

This disclosure relates generally to the field of mail delivery, and, in particular, to an automatic mail notification system.

BACKGROUND

Delivery of mail to a user mailbox is a routine activity in contemporary life. However, notification of an actual delivery of mail to the user mailbox requires a user to physically examine the contents of the user mailbox by moving in proximity to the user mailbox and examining its contents, typically outside, without first knowing whether or not delivery has actually occurred. It would be advantageous for the user to be informed automatically of the receipt of mail in the user mailbox prior to physical movement to the location of the user mailbox.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides an automatic mail notification system. Accordingly, a mail notification system, including an energy emitter device configured to emit energy; a sensing device coupled to the energy emitter device, the sensing device configured to receive the energy from the energy emitter device to produce a sensed signal; a detection device coupled to the sensing device, the detection device configured to detect a transition state of the sensed signal and configured to produce a digital message; and a housing configured to receive one or more mail, wherein the housing houses the energy emitter device, the sensing device, and the detection device.

In one example, the mail notification system further includes a communication device coupled to the detection device, the communication device configured to convey the digital message from a source to a destination. In one example, the mail notification system further includes an energy source configured to provide electrical energy to one or more of the following: the energy emitter, the sensing device, the detection device and the communication device.

In one example, the source is the housing. In one example, the destination is a receiving device. In one example, the destination is a destination section including a receiving device, a processing device and a notification device. In one example, the destination is a home or a business location of a user. In one example, the receiving device is configured to retrieve the digital message.

In one example, the processing device is coupled to the receiving device and the processing device is configured to prepare a notification message based on the digital message. In one example, the notification device is coupled to the processing device and the notification device is configured to notify a user with the notification message, and wherein the notification message conveys a container state of the housing.

Another aspect of the disclosure provides a method for implementing an automatic mail notification, the method including emitting energy from an energy emitter device; receiving the energy from the energy emitter device to produce a sensed signal; detecting a transition state of the sensed signal to produce a digital message; and conveying the digital message from a housing to a destination, wherein the housing is configured to receive one or more mail.

In one example, the energy is an electromagnetic energy with one of the following: visible wavelengths, infrared wavelengths, microwave or radio wavelengths. In one example, the energy is an acoustic energy with one of the following: a sonic frequency band, an ultrasonic frequency band or an infrasonic frequency band. In one example, the energy is emitted by a light emitting diode (LED), an acoustic source, an ultrasonic source or an infrasonic source. In one example, the transition state includes a hysteresis logic.

In one example, the method further includes encoding the digital message into a communication signal, wherein the communication signal is configured to convey the digital message to the destination. In one example, the method further includes transporting the communication signal over a wireless communication link, wherein the wireless communication link conforms with one of the following wireless protocols: Wi-Fi, Bluetooth, near field communication (NFC), Infrared Data Association (IrDA), long-term evolution (LTE), a $3^{rd}$ Generation Partnership Project (3GPP) wireless protocol.

In one example, the method further includes retrieving the digital message from the communication signal; and preparing a notification message based on the digital message, wherein the notification message conveys a container state of the housing.

Another aspect of the disclosure provides an apparatus implementing an automatic mail notification, the apparatus including means for emitting energy from an energy emitter device; means for receiving the energy from the energy emitter device to produce a sensed signal; means for detecting a transition state of the sensed signal to produce a digital message; means for encoding the digital message into a communication signal; and means for conveying the digital message from a housing to a destination, wherein the housing is configured to receive one or more mail.

In one example, the apparatus further includes means for retrieving the digital message from the communication signal; and means for preparing a notification message based on the digital message, wherein the notification message conveys a container state of the housing.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
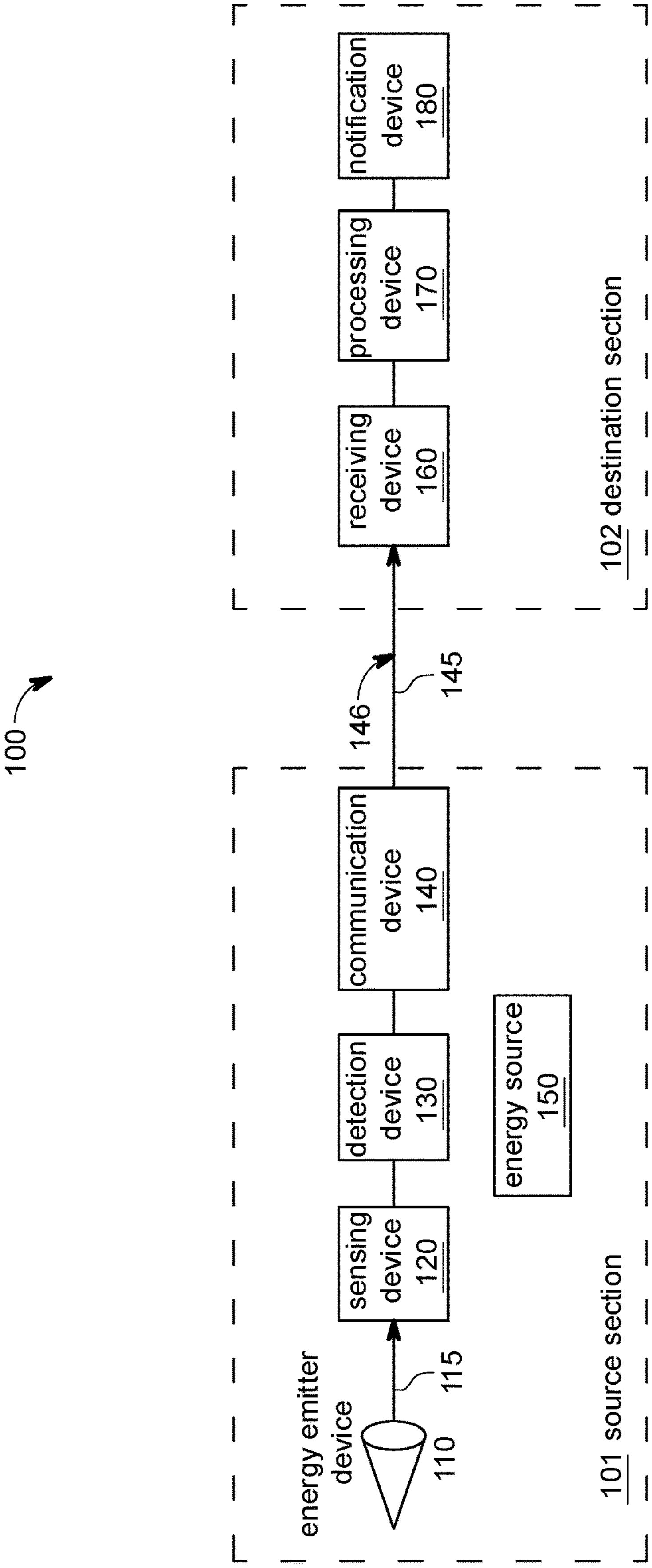
FIG. 1 illustrates an example block diagram of an automatic mail notification system.

FIG. 1 illustrates an example block diagram of an automatic mail notification system 100. The example automatic mail notification system 100 includes a source section 101, where sensing is performed and a notification is generated, and a destination section 102, where the notification may be received. In one example, the source section 101 is a physical mailbox for receiving mail. In one example, mail is one or more letters and/or packages, for example, delivered by a postal carrier or a private delivery personnel. The source section 101 of the automatic mail notification system 100 may have a plurality of source devices such as an energy emitter device 110, a sensing device 120, a detection device 130, a communication device 140 and an energy source 150. The destination section 102 of the automatic mail notification system 100 may have a plurality of destination devices such as a receiving device 160, a processing device 170 and a notification device 180. One skilled in the art would understand that the example components disclosed herein for either the source section 101 or the destination section 102 are not exclusive and that other components may be included within the spirit and scope of the present disclosure. Additionally, in one example, not all the components disclosed herein for the source section 101 are mandatory. Similarly, in one example, not all the components disclosed herein for the destination section 102 are mandatory.

In one example, the energy emitter device 110 may be a visible light source or an infrared light source. In one example, the energy emitter device 110 emits energy to a sensing device 120. In one example, the energy is a sensing signal 115 which is sent to the sensing device 120. For example, the energy emitter device 110 may be a light emitting diode (LED). In one example, the energy emitter device 110 may be an acoustic source. For example, the energy emitter device 110 may be an ultrasonic source (i.e., a source which produces high frequency inaudible sound waves).

In one example, the sensing device 120 receives energy from the sensing signal 115 which is generated by the energy emitter device 110 and produces a sensed signal which depends on the energy level of the sensing signal 115. In one example, the sensed signal is produced by converting the received energy received from the energy emitter device 110 into a sensed electrical signal. The sensed electrical signal, for example, may include a sensed signal amplitude. For example, the sensed signal amplitude is monotonically related to the received energy. That is, as the received energy increases, the sensed signal amplitude increases. That is, as the received energy decreases, the sensed signal amplitude decreases.

In one example, the sensed signal changes amplitude state when the sensed signal amplitude transitions between two discrete states when an obstruction causes the energy level of the sensing signal to change by at least a minimum energy differential. For example, the minimum energy differential is equivalent to when the energy level of the sensing signal changes by an amplitude transition greater than a predefined amplitude threshold. That is, a changed sensed signal is a sensed signal from the sensing device 120 with an energy level change with an amplitude transition greater than the predefined amplitude threshold. In one example, the predefined amplitude threshold may be defined as greater than 50% change from a nominal amplitude level. One skilled in the art would understand that the percentage of change may be a value other than 50%. For example, the percentage of change may be set by a user and/or may be dependent one or more factors, such as the sensitivity of one or more component of the source section 101.

In one example, the sensing device 120 may be a light sensor. For example, the sensing device 120 may be sensitive to visible wavelengths (e.g., between 400 nm and 700 nm wavelengths) generated by the energy emitter device 110. For example, the sensing device 120 may be sensitive to infrared wavelengths (e.g., greater than 700 nm wavelength) generated by the energy emitter device 110. In one example, the light sensor is a photodetector. For example, the light sensor may be sensitive to visible wavelengths. For example, the light sensor may be sensitive to infrared (IR) wavelengths. In one example, the sensing device 120 may be an acoustic sensor for example, a sonic sensor, an ultrasonic sensor, etc. In one example, the sensing device 120 is matched to the energy emitter device 110. That is, if the energy emitter device 110 generates electromagnetic energy within a spectral band, then the sensing device 120 is sensitive to electromagnetic energy in that spectral band. If the energy emitter device 110 generates acoustic energy within an acoustic frequency band, then the sensing device 120 is sensitive to acoustic energy within that acoustic frequency band.

In one example, the sensing device 120 is vibration-tolerant. For example, a vibration-tolerant sensing device does not produce a changed sensed signal when a mechanical vibration occurs at the sensing device 120.

In one example, the sensing device 120 may be a photodiode. In one example, the photodiode is a light sensitive detector which absorbs incident photons and produces a photodiode electrical current which depends on the photon rate or input power level. In one example, the light sensitive detector may be sensitive to a spectral band (e.g., visible, ultraviolet, infrared, etc.). For example, the photon rate may be expressed in photons/sec or in watts. For example, the electrical current may be expressed in amperes (A), milliamperes (mA), microamperes (μA), etc. In one example, the photodiode electrical current may be proportional to the photon rate or input power level. For example, a ratio of photodiode electrical current over input power level may be denoted as responsivity R in units of amperes per watt (A/W).

In one example, the detection device 130 detects a transition state from the sensed signal from the sensing device 120 to produce a digital message. In one example, the detection device 130 compares the sensed signal from the sensing device 120 to a threshold level. For example, the detection device 130 compares the sensed signal amplitude to the threshold level. For example, the detection device 130 may be coupled to the sensing device 120 to determine whether or not the sensed signal (e.g., the sensed signal amplitude) has changed state and to indicate a transition state. In one example, the transition state may be represented by the digital message. The digital message may be generated by the detection device 130. For example, the digital message may be a binary indication of whether the transition state indicates a change from an empty state to a non-empty state. For example, the transition state may be an indication of a change from an empty container to a non-empty container. For example, the container may be a user mailbox which is a repository for received mail. In one example, the container may be a locker and the container state is an indication of an empty locker or a non-empty locker in which the content may include mail, clothing, books, boxes, etc. In one example, the container may be a house or a dwelling and the container state is an indication of an empty house or a non-empty house in which the container state may include whether or not a person or an animal has entered the house.

In one example, the detection device 130 may include hysteresis logic. For example, hysteresis logic includes a logical dependence on its state history. That is, the detection of the transition state depends not only on the comparison of the sensed signal amplitude to the threshold level, but also on the state history of the sensed signal. For example, the state history may include a finite time duration of the sensed signal prior to a present time.

In one example, the communication device 140 encodes the digital message from the detection device 130 into a communication signal 145 which conveys the digital message from a source to a destination. For example, the communication signal 145 may be transmitted from a user mailbox to a receiver in a home. For example, the communication signal 145 may be transported over a wireless communication link 146 which conforms with a wireless protocol. In another example, the communication signal 145 may be transported over a wired link (not shown).

In one example, the wireless communication link 146 may be based on a short-range wireless system which conforms with a wireless protocol such as Wi-Fi, Bluetooth, near field communication (NFC), Infrared Data Association (IrDA), etc. or on a long-range wireless system which conforms with a wireless protocol such as, long-term evolution (LTE), a 3' Generation Partnership Project (3GPP) wireless protocol (e.g., 5G, 6G, etc). For example, a short-range wireless system may be used for propagation distances much less than 100 m, i.e., within a home, small business, local environment, etc. For example, a long-range wireless system may be used for propagation distances much greater than 100 m, i.e., over a neighborhood, town, city, etc.

In one example, a Wi-Fi system conforms with an IEEE 802.11 wireless protocol which uses microwave frequency bands (e.g., 2.4 GHz, 5 GHz, etc.) to cover short ranges (e.g., <100 m propagation distance). For example, there are a plurality of Wi-Fi versions which use different modulation types and formats.

In one example, a Bluetooth system conforms with a Bluetooth wireless protocol which uses microwave frequency bands (e.g., 2.4 GHz) to cover very short ranges (e.g., <10 m propagation distance).

In one example, an IrDA system conforms with an IrDA wireless protocol which uses near-IR frequency bands (e.g., 300-400 THz) to cover very short ranges (e.g., <10 m propagation distance).

In one example, the energy source 150 may be a battery (e.g., a chargeable battery or a non-chargeable battery), a solar cell, etc. For example, the energy source 150 may be used to provide electrical energy for the plurality of devices (e.g., one or more of: an energy emitter device 110, a sensing device 120, a detection device 130, a communication device 140 and/or an energy source 150) in the automatic mail notification system 100.

In one example, the receiving device 160 retrieves the digital message from the communication signal 145 using a receiver. In one example, the receiving device 160 is in a home or a business location. In one example, the receiving device 160 decodes the communication signal 145 to retrieve the digital message created by the detection device 130.

In one example, the processing device 170 accepts the retrieved digital message from the receiving device 160 and prepares a notification message to be presented to the user. In one example, the notification message may be a binary message which indicates a container state (e.g., user mailbox state). For example, the container state may indicate a change from an empty state to a non-empty state.

In one example, the notification device 180 accepts the notification message from the processing device 170 and notifies the user of the container state. In one example, the user notification may be a visual display (e.g., graphical icons) which indicates the container state. In one example, the user notification may be a text message or an electronic mail (email) message sent to the user. In one example, the user notification may be an audio indication which indicates the container state.

Figure 2:
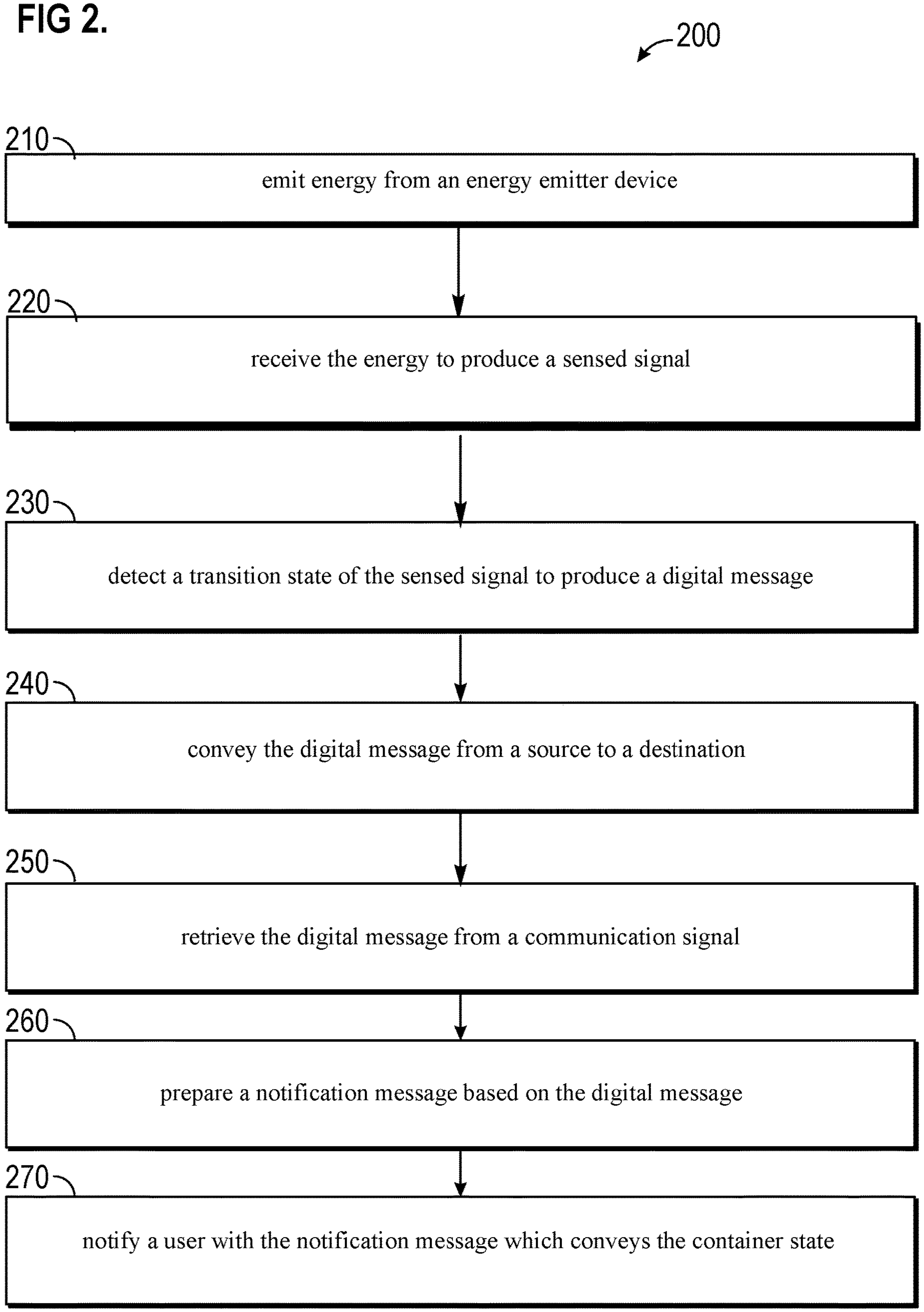
FIG. 2 illustrates an example flow diagram for automatic mail notification.

FIG. 2 illustrates an example flow diagram 200 for automatic mail notification. In block 210, emit energy from an energy emitter device. That is, an energy emitter device emits energy. In one example, the energy may include a sensing signal. In one example, the—energy is electromagnetic energy. For example, the electromagnetic energy may include visible wavelengths. For example, the electromagnetic energy may include infrared wavelengths. For example, the electromagnetic energy may include microwave or radio wavelengths. In one example, the energy is acoustic energy. For example, the acoustic energy may include a sonic frequency band. For example, the acoustic energy may include an ultrasonic frequency band. For example, the acoustic energy may include an infrasonic frequency band. In one example, the energy may include a sensing signal. For example, the energy may be generated by a light emitting diode (LED). For example, the energy may be generated by an acoustic source. For example, the energy may be generated by an ultrasonic source. For example, the energy may be generated by an infrasonic source.

In block 220, receive the energy from the energy emitter device to produce a sensed signal using a sensing device. That is, a sensing device receives the energy from the energy emitter device to produce a sensed signal. In one example, the received energy is the sensing signal generated by the energy emitter device. In one example, the received energy is used to produce a sensed signal which depends on the energy level of the sensing signal. In one example, the sensing device is a light sensor. For example, the light sensor is a photodiode. In one example, the sensing device is an acoustic sensor. For example, the acoustic sensor is a sonic sensor, an ultrasonic sensor, an infrasonic sensor, etc.

In block 230, detect a transition state of the sensed signal using a detection device to produce a digital message. That is, a detection device detects a transition state of the sensed signal and produces a digital message. In one example, detecting the transition state determines whether or not the sensed signal has changed state. In one example, the transition state may be represented by the digital message. In one example, detecting a transition state from the sensed signal may include hysteresis logic. For example, hysteresis logic may detect the transition state in accordance with its state history. That is, the detection of the transition state depends not only on the comparison of the sensed signal amplitude to the threshold level, but also on the state history of the sensed signal.

In block 240, convey the digital message from a source to a destination using a communication device. That is, a communication device conveys the digital message from a source to a destination. In one example, the source is a transmitter. For example, the transmitter is within a container, e.g., a user mailbox or a mailbox for housing (e.g., receiving) one or more letters and/or packages. In one example, a physical mailbox is a housing for containing one or more devices of the source section 101 illustrated in FIG. 1. In one example, the devices of the source section 101 include an energy emitter device 110, a sensing device 120, a detection device 130, a communication device 140 and an energy source 150. In one example, the destination is a receiving device. For example, the receiving device is within a home or a business location. In another example, the destination is the destination section 102 illustrated in FIG. 1, wherein the destination section includes one or more of a receiving device 160, a processing device 170 and a notification device 180. In one example, the destination is a house or a business location of a user.

In one example, the communication device encodes the digital message into a communication signal which conveys the digital message from a source to a destination. For example, the communication signal may be transported over a wireless communication link which conforms with a wireless protocol. In one example, the wireless communication link may be based on a short-range wireless system which conforms with a wireless protocol such as Wi-Fi, Bluetooth, near field communication (NFC), Infrared Data Association (IrDA), etc. or on a long-range wireless system which conforms with a wireless protocol such as LTE, 5G, 6G, etc. In another example, the communication signal may be transported directly from a source to a destination over a direct wired link.

In block 250, retrieve the digital message using a receiving device. That is, a receiving device retrieves the digital message. In one example, retrieve the digital message from the communication signal using a receiving device. That is, a receiving device retrieves the digital message from a communication signal since the communication device encodes the digital message into the communication signal. In one example, the receiving device retrieves the digital message from the communication signal using a receiver. In one example, the receiving device is in a home (e.g., house) or a business location of a user. In one example, the receiving device decodes the communication signal to retrieve the digital message created by the detection device.

In block 260, prepare a notification message based on the digital message using a processing device. That is, a processing device prepares a notification message based on the digital message. In one example, accept the digital message from the receiving device. In one example, the notification message may be a binary message which indicates the container state (e.g., user mailbox state). For example, the notification message indicates whether there is or is not mail inside a user's mailbox. In one example, the mailbox is a housing for one or more of the devices (e.g., an energy emitter device 110, a sensing device 120, a detection device 130, a communication device 140 and/or an energy source 150) of the source section 101 in FIG. 1. In one example, the mailbox is a physical mailbox.

In block 270, notify a user with the notification message which conveys the container state using a notification device. That is, a notification device notifies a user with a notification message which conveys the container state. In one example, a notification device accepts the notification message from the processing device. In one example, the user notification may be a visual display (e.g., graphical icons) which indicates the container state. In one example, the user notification may be a text message or an electronic mail (email) message sent to the user. In one example, the user notification may be an audio indication which indicates the container state.

Figure 3:
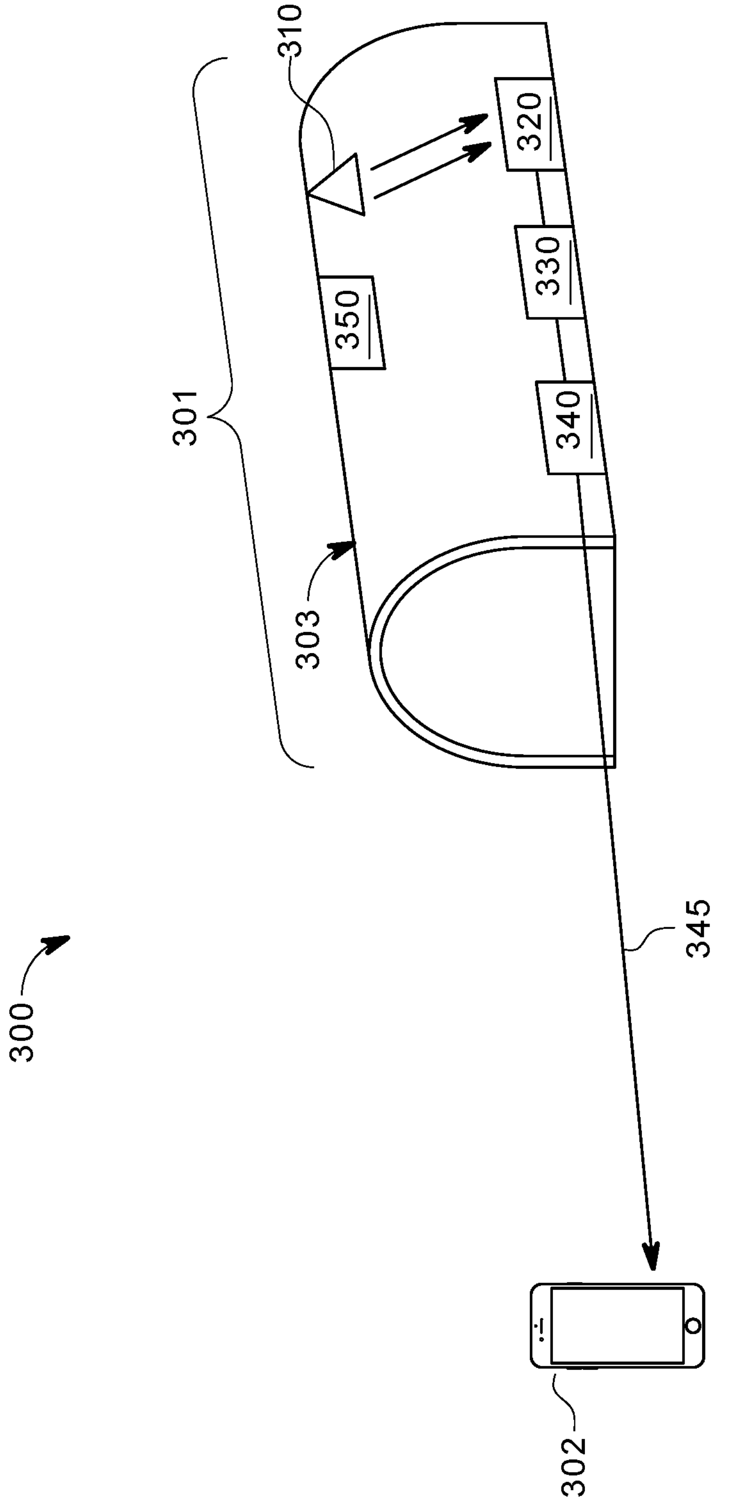
FIG. 3 illustrates an example of an automatic mailbox notification system.

FIG. 3 illustrates an example of an automatic mailbox notification system 300. In one example, a user mailbox 303 is a repository for mail delivered by a mail carrier. In an initial state, the user mailbox 303 is empty and the purpose of the automatic mailbox notification system is to notify a user of receipt of mail upon delivery. For example, the user may be notified of receipt of mail on a mobile device 302, for example, a mobile phone. The user notification may be executed by a software application (e.g., an app) on the mobile device 302 as text message, email, graphical icon, audio indication, etc. In one example, the mobile device 302 is a destination section (e.g., destination section 102 shown in FIG. 1) for the automatic mailbox notification system 300.

In one example, a source section 301 of the automatic mailbox notification system 300 may be retrofitted into an existing user mailbox where the source section 301 is added onto an already manufactured existing user mailbox. In one example, the source section 301 of the automatic mailbox notification system 300 may be integrated into an user mailbox where the source section 301 is manufactured along with the rest of the user mailbox. For example, the source section 301 may have a plurality of source devices such as an energy emitter device 310, a sensing device 320, a detection device 330, a communication device 340 and an energy source 350. One skilled in the art would understand that the example components disclosed herein for the source section 301 are not exclusive and that other components may be included within the spirit and scope of the present disclosure. Additionally, in one example, not all the components disclosed herein for the source section 301 are mandatory.

In one example, the sensing device 320 may be a conformal sensor assembly. In one example, the conformal sensor assembly is a geometric arrangement of a plurality of sensor elements which conforms (i.e., follows) to a predefined shape. In one example, the conformal sensor assembly in a user mailbox may conform to a non-planar surface area by a congruent geometric shape.

Figure 4:
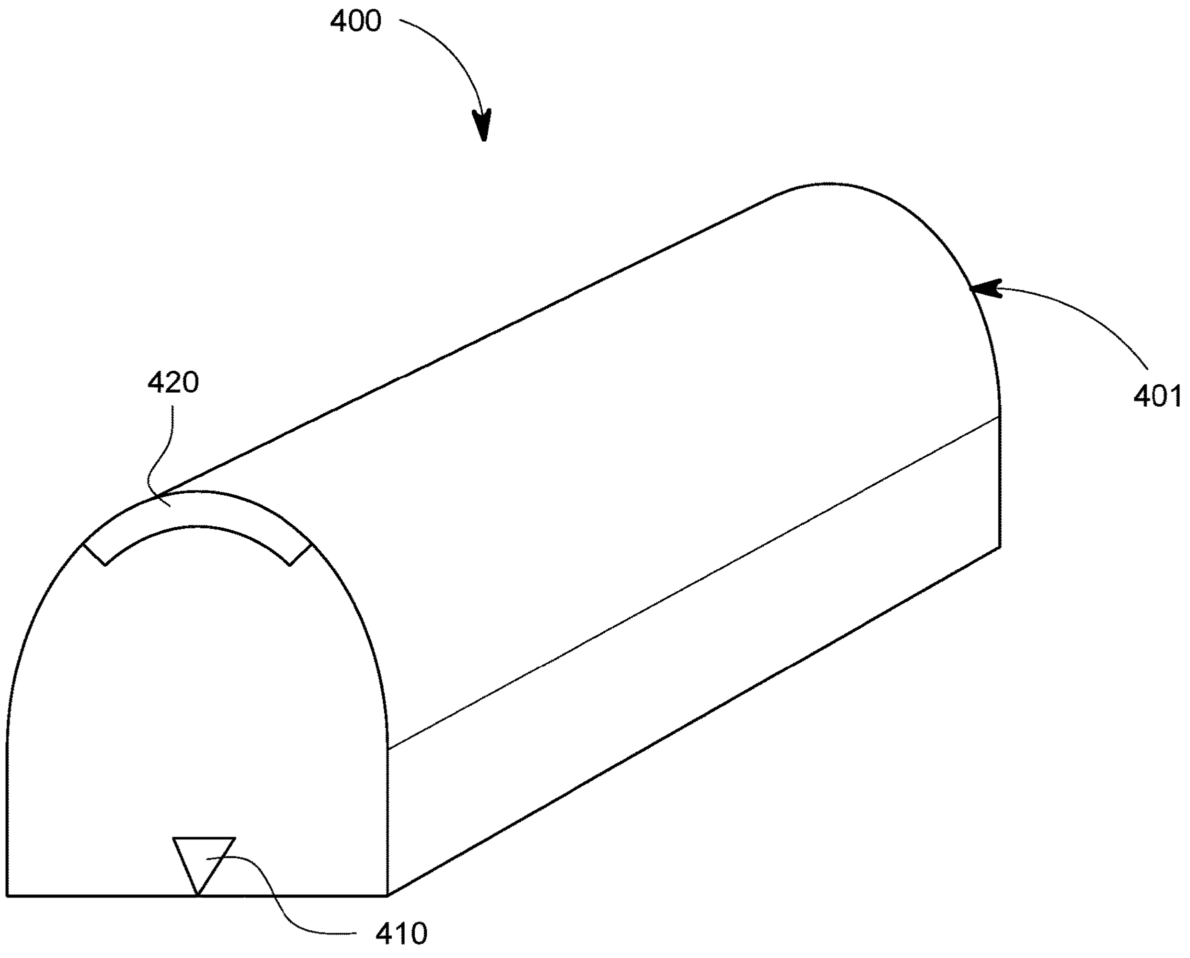
FIG. 4 illustrates an example of a conformal sensor assembly within a container with a plurality of sensor elements.

FIG. 4 illustrates an example of a conformal sensor assembly 400 within a container 401 (e.g., a user mailbox) with a plurality of sensor elements 420. In one example, the plurality of sensor elements 420 may be light sensors (e.g., visible light sensor, infrared light sensor, etc.) such as photodetectors, photodiodes, etc. In one example, the plurality of sensor elements 420 receives energy directly from an energy emitter device 410. In addition, the container 401 includes a detection device (e.g., detection device 130 of FIG. 1), a communication device (e.g., communication device 140 of FIG. 1), an energy source (e.g., an energy source 150 of FIG. 1), etc.

In one example, the energy from the energy emitter device 410 is radiated directly towards the plurality of sensor elements 420. For example, if the container 401 is empty (i.e., no mail has been delivered), the plurality of sensor elements 420 will receive an energy level greater than a predefined threshold. For example, if the container 401 is not empty (i.e., mail has been delivered), the plurality of sensor elements 420 will receive an energy level less than the predefined threshold. In one example, the container 401 is a housing.

Figure 5:
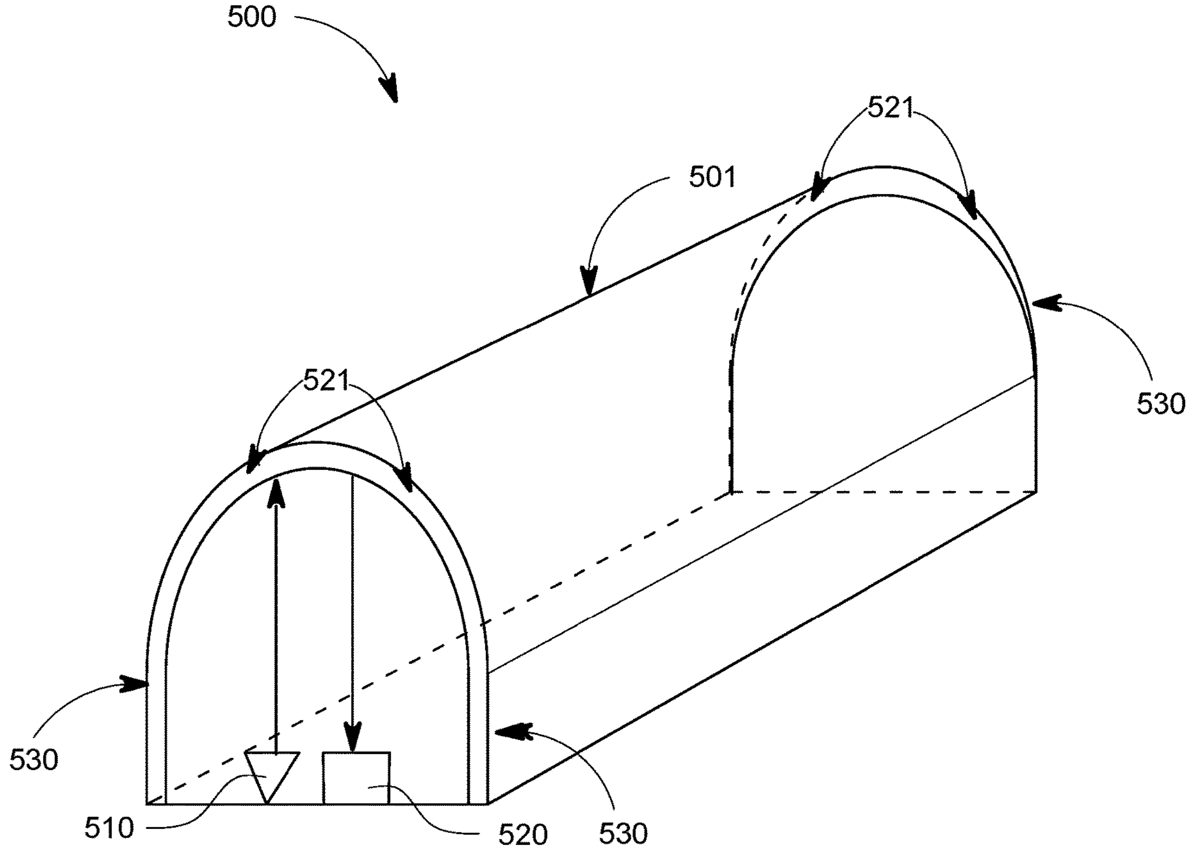
FIG. 5 illustrates an example of a conformal sensor assembly within a container with a plurality of sensor elements and a reflective surface.

FIG. 5 illustrates an example of a conformal sensor assembly 500 within a container 501 (e.g., a user mailbox) with a plurality of sensor elements 520 and a reflective surface 521. In one example, the plurality of sensor elements 520 may be light sensors (e.g., visible light sensor, infrared light sensor, etc.) such as photodetectors, photodiodes, etc. In one example, the plurality of sensor elements 520 receives energy indirectly from an energy emitter device 510 by receiving reflected energy off the reflective surface 521. Although the reflective surface 521 is shown in FIG. 5 as lining the entire curved portion 530 of container 501, one skilled in the art would understand that the reflective surface 521 may also line just portions of the curved portion 530 (i.e., not the entire curved portion 530) of the container 501 within the spirit and scope of the present disclosure. In addition, the container 501 includes a detection device (e.g., detection device 130 of FIG. 1), a communication device (e.g., communication device 140 of FIG. 1), an energy source (e.g., an energy source 150 of FIG. 1), etc. In one example, the container 501 is a housing.

In one example, the energy from the energy emitter device 510 is radiated toward the reflective surface 521 which reflects the energy towards the plurality of sensor elements 520. For example, if the container 501 is empty (i.e., no mail has been delivered), the plurality of sensor elements 520 will receive an energy level greater than a predefined threshold. For example, if the container 501 is not empty (i.e., mail has been delivered), the plurality of sensor elements 520 will receive an energy level less than the predefined threshold.

In one aspect, one or more of the steps for providing an automatic mail notification system in FIG. 2 may be executed by one or more processors which may include hardware, software, firmware, etc. The one or more processors, for example, may be used to execute software or firmware needed to perform the steps in the flow diagram of FIG. 2. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “coupled” is used herein to refer to the direct or indirect coupling between two objects. For example, if object A physically touches object B, and object B touches object C, then objects A and C may still be considered coupled to one another—even if they do not directly physically touch each other. The terms “circuit” and “circuitry” are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. A mail notification system, comprising:

an energy emitter device configured to emit energy;

a sensing device coupled to the energy emitter device, the sensing device configured to receive the energy from the energy emitter device to produce a sensed signal;

a detection device coupled to the sensing device, the detection device configured to detect a transition state of the sensed signal based on a comparison of a sensed signal amplitude to a threshold level, and configured to produce a digital message; and a housing configured to receive one or more mail, wherein the housing houses the energy emitter device, the sensing device, and the detection device.

2. The mail notification system of claim 1, further comprising a communication device coupled to the detection device, the communication device configured to convey the digital message from a source to a destination.

3. The mail notification system of claim 2, further comprising an energy source configured to provide electrical energy to one or more of the following: the energy emitter, the sensing device, the detection device and the communication device.

4. The mail notification system of claim 3, wherein the source is the housing.

5. The mail notification system of claim 4, wherein the destination is a receiving device.

6. The mail notification system of claim 4, wherein the destination is a destination section comprising a receiving device, a processing device and a notification device.

7. The mail notification system of claim 6, wherein the destination is a home or a business location of a user.

8. The mail notification system of claim 6, wherein the receiving device is configured to retrieve the digital message.

9. The mail notification system of claim 8, wherein the processing device is coupled to the receiving device and the processing device is configured to prepare a notification message based on the digital message.

10. The mail notification system of claim 9, wherein the notification device is coupled to the processing device and the notification device is configured to notify a user with the notification message, and wherein the notification message conveys a container state of the housing.

11. A method for implementing an automatic mail notification, the method comprising:

emitting energy from an energy emitter device;

receiving the energy from the energy emitter device to produce a sensed signal;

detecting a transition state of the sensed signal to produce a digital message, wherein the sensed signal is based on a comparison of a sensed signal amplitude to a threshold level; and conveying the digital message from a housing to a destination, wherein the housing is configured to receive one or more mail.

12. The method of claim 11, wherein the energy is an electromagnetic energy with one of the following: visible wavelengths, infrared wavelengths, microwave or radio wavelengths.

13. The method of claim 11, wherein the energy is an acoustic energy with one of the following: a sonic frequency band, an ultrasonic frequency band or an infrasonic frequency band.

14. The method of claim 11, wherein the energy is emitted by a light emitting diode (LED), an acoustic source, an ultrasonic source or an infrasonic source.

15. The method of claim 14, wherein the transition state includes a hysteresis logic.

16. The method of claim 15, further comprising encoding the digital message into a communication signal, wherein the communication signal is configured to convey the digital message to the destination.

17. The method of claim 16, further comprising transporting the communication signal over a wireless communication link, wherein the wireless communication link conforms with one of the following wireless protocols: Wi-Fi, Bluetooth, near field communication (NFC), Infrared Data Association (IrDA), long-term evolution (LTE), a 3$^{rd}$ Generation Partnership Project (3GPP) wireless protocol.

18. The method of claim 17, further comprising retrieving the digital message from the communication signal; and preparing a notification message based on the digital message, wherein the notification message conveys a container state of the housing.

19. An apparatus implementing an automatic mail notification, the apparatus comprising:

means for emitting energy from an energy emitter device;

means for receiving the energy from the energy emitter device to produce a sensed signal;

means for detecting a transition state of the sensed signal to produce a digital message, wherein the sensed signal is based on a comparison of a sensed signal amplitude to a threshold level;

means for encoding the digital message into a communication signal; and means for conveying the digital message from a housing to a destination, wherein the housing is configured to receive one or more mail.

20. The apparatus of claim 19, further comprising:

means for retrieving the digital message from the communication signal; and means for preparing a notification message based on the digital message, wherein the notification message conveys a container state of the housing.

* * * * *